United States Patent
Beck et al.

(10) Patent No.: US 8,661,541 B2
(45) Date of Patent: *Feb. 25, 2014

(54) DETECTING USER-MODE ROOTKITS

(75) Inventors: Douglas Reed Beck, Seattle, WA (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,849

(22) Filed: Jan. 3, 2011

(65) Prior Publication Data

US 2011/0099632 A1   Apr. 28, 2011

Related U.S. Application Data

(63) Continuation of application No. 11/183,225, filed on Jul. 15, 2005, now Pat. No. 7,874,001.

(51) Int. Cl.
*G06F 21/00* (2013.01)

(52) U.S. Cl.
USPC ............................................. 726/23; 713/164

(58) Field of Classification Search
None
See application file for complete search history.

(56) References Cited

U.S. PATENT DOCUMENTS

| 5,991,766 | A | 11/1999 | Sadiq et al. |
| 6,550,060 | B1 | 4/2003 | Hammond |
| 7,512,977 | B2 | 3/2009 | Cook et al. |
| 7,627,898 | B2 | 12/2009 | Beck et al. |
| 7,784,098 | B1 * | 8/2010 | Fan et al. ........................ 726/25 |
| 2002/0129264 | A1 | 9/2002 | Rowland et al. |
| 2002/0133590 | A1 * | 9/2002 | McBrearty et al. ........... 709/225 |
| 2003/0001854 | A1 * | 1/2003 | Jade et al. ..................... 345/581 |
| 2003/0188189 | A1 | 10/2003 | Desai et al. |
| 2004/0039921 | A1 | 2/2004 | Chuang |
| 2004/0049693 | A1 | 3/2004 | Douglas |
| 2005/0091558 | A1 | 4/2005 | Chess et al. |
| 2005/0193428 | A1 | 9/2005 | Ring et al. |
| 2005/0204205 | A1 * | 9/2005 | Ring et al. ...................... 714/47 |
| 2005/0216770 | A1 | 9/2005 | Rowett et al. |
| 2005/0229250 | A1 | 10/2005 | Ring et al. |
| 2006/0026683 | A1 | 2/2006 | Lim |

(Continued)

FOREIGN PATENT DOCUMENTS

| GB | 2427716 | * | 6/2005 |
| GB | 2427716 | A | | 1/2007 |

OTHER PUBLICATIONS

U.S. Appl. No. 11/183,318, Yan et al.

(Continued)

*Primary Examiner* — Philip Chea
*Assistant Examiner* — Carlton Johnson
(74) *Attorney, Agent, or Firm* — Holly Nguyen; Carole Boelitz; Micky Minhas

(57) ABSTRACT

A method and system for determining whether resources of a computer system are being hidden is provided. The security system invokes a high-level function of user mode that is intercepted and filtered by the malware to identify resources. The security system also directly invokes a low-level function of kernel mode that is not intercepted and filtered by the malware to identify resources. After invoking the high-level function and the low-level function, the security system compares the identified resources. If the low-level function identified a resource that was not identified by the high-level function, then the security system may consider the resource to be hidden.

17 Claims, 6 Drawing Sheets

(56) References Cited

U.S. PATENT DOCUMENTS

| | | | |
|---|---|---|---|
| 2006/0031673 A1* | 2/2006 | Beck et al. | 713/164 |
| 2006/0074896 A1* | 4/2006 | Thomas et al. | 707/4 |
| 2006/0179484 A1 | 8/2006 | Scrimsher et al. | |
| 2007/0112866 A1 | 5/2007 | Olson-Williams | |

OTHER PUBLICATIONS

"Appinit_DLLs Registry Value and Windows 95," Microsoft Corporation, Article ID 134655, last review Mar. 1, 2005, revision 3.2, 2 pages, http://support.microsoft.com/kb/134655/.

"How to Use the Windiff.exe Utility," Microsoft Knowlege Base Article—159214, Copyright 2004, Microsoft Corporation (3 pages) http://support.microsoft.com/default.aspx?scid=kb;en-us;159214.

"Working with the AppInit_DLLs registry value," Microsoft Corporation, Article ID 197571, last review Feb. 19, 2005, revision 4.0, 1 page, http://support.microsoft.com/default.aspx?scid=kb;en-us;197571.

Altunergil, Oktay, "Scanning for Rootkits," Linux Devcenter.com, Feb. 7, 2002 (8 pages).

Altunergil, Oktay, "Understanding Rootkits," Linus Devcenter.com, Dec. 14, 2001 (3 pages).

Bios Boot Specification, Compaq Computer Corporation, Phoenix Technologies, Ltd., Intel Corporation, Version 1.01, Jan. 11, 1996 (46 pages).

Busleiman, Arturo, "Detecting and Understanding Rootkits," Sep. 2003 (13 pages).

Dittrich, "Root Kits and Hiding Files/Directories/Processes After a Break-in," Jan. 2002 (12 pages).

Holy_father@phreaker.net, "Invisibility on NT boxes—How to become unseen on Windows NT," Code Breakers Journal, vol. 1, No. 2 (2004), May 8, 2003, 26 pages.

Kodmaker@syshell.org, "NTIllusion: A Portable Win 32 userland rootkit," Phrack Inc., vol. 0x0b, Issue 0x3e, Phile #0x0c of 0x10, Jul. 13, 2004, 28 pages.

Landsberg, G.L., "Computer viruses and methods of combating them," Institute of High Energy Physics, Protvino, Moscow Region, American Institute of Physics, Feb. 1991, pp. 185-200.

Muttik, Igor, "Stripping Down an AV Engine," Virus Bulletin Conference, Sep. 2000, pp. 59-68.

NISCC Technical note 08/03, "Trojan Horse Programs and Rookies", Issued: Sep. 10, 2003.

NTQuerySystemInformation, Microsoft, Jul. 2005, 4 pages, http://msdn.microsoft.com/library/en-us/sysinfo/base/ntquerysysteminformation.asp?frame=true.

Poulsen, Kevin, "Windows Root Kits a Stealthy Threat," The Register, SecurityFocus Online, Mar. 7, 2003 (3 pages).

Schneier, Bruce, "Schneier on Security: —A weblog covering security and security technology: GhostBuster," Feb. 15, 2005, 9 pages, http://www.schneier.com/blog/archives/2005/02/ghostbuster.html.

T.Garfinkel and M. Rosenblum, "A Virtual Machine Introspection Based Architecture for Intrusion Detection", In Proceedings of the Symposium on Network and Distributed Systems Security (SNDSS), pp. 191-206, Feb. 2003.

Wang, Yi-Min and Doug Beck, "How to 'Root' a Rootkit That Supports Root Processes Using Strider Ghostbuster Enterprise Scanner," Microsoft Technical Report MSR-TR-2005-21, Feb. 11, 2005, Microsoft Research, 2 pages.

Wang, Yi-Min, Binh Vo, Roussi Roussev, Chad Verbowski and Aaron Johnson, "Strider GhostBuster: Why It's a Bad Idea for Stealth Software to Hide Files," Microsoft Research Technical Report MSR-TR-2004-71, Jul. 24, 2004, pp. 1-15.

Wang, Yi-Min, Doug Beck, Binh Vo, Roussi Roussev and Chad Verbowski, "Detecting Stealth Software with Strider GhostBuster," Microsoft Technical Report MSR-TR-2005-25, publicly released on Feb. 21, 2005, Microsoft Research, 11 pages.

Wang, Yi-Min, Roussi Roussev, Chad Verbowski, Aaron Johnson and David Ladd, "AskStrider: What Has Changed on My Machine Lately?," Microsoft Research Technical Report MSR-TR-2004-03, Jan. 5, 2004, 13 pages.

* cited by examiner

DETECTING USER-MODE ROOTKITS

CROSS REFERENCE TO RELATED APPLICATION

This application is a continuation application of U.S. patent application Ser. No. 11/183,225, filed on Jul. 15, 2005, issued as U.S. Pat. No. 7,874,001, which is incorporated herein in its entirety by reference.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs, operating systems, and other computer programs executing on those computer systems. One of the most destructive methods of attacking a computer system has been to modify portions of the operating system that is stored on a boot storage device with software that may perform many of the same functions of the operating system, but also includes malicious functions. These modifications can be either to replace portions of the operating system or to add new programs that are automatically started by the operating system. Such software is referred to as "malware" because of its malicious nature. Once malware is installed on a boot storage device or loaded onto a booted computer system, the operating system is "infected" and the malware can control all aspects of the computer system. Such malware includes rootkits, Trojan horses, keystroke loggers, spyware, and so on. For example, the malware could intercept keystrokes that a user enters (e.g., a password) and report them to another computer system. As another example, the malware could be a worm that launches a self-propagating attack that exploits a vulnerability of a computer system by taking control and using that computer system to find other computer systems with the same vulnerability and launch attacks (i.e., send the same worm) against them.

To prevent detection, malware often uses advanced stealth techniques to make its resources such as executable files, data files (e.g., recorded keystroke files), and processes "invisible" or "hidden." Once malware is started, it may intercept all queries (e.g., system calls) and use filtering to ensure that a chosen subset of its resources is never revealed to any query operations by any program running on the infected computer system. For example, a keystroke logger may intercept all requests from programs for file listings and delete the name of its log file from the list that is returned to the programs. The keystroke logger may even intercept requests for available disk space and add the size of the log file to the available disk space to make it difficult to detect the presence of the log file. The keystroke logger may also intercept all requests from programs for process related information and remove any information related to the keystroke logger process, task, thread, and so on. These stealth techniques can defeat both experienced system administrators who use common operating system utilities, such as WINDOWS Explorer, a directory list command, a registry editor, a task manger, and so on, to search the file system, configuration files (e.g., registry files), and process tables for suspicious entries, and commonly used malware scanning tools that are based on known malware file signatures.

Many different techniques have been used to help detect the presence of such malware; unfortunately, detection of some malware has proved to be difficult. One technique attempts to identify the presence of malware by the presence of an open port. Malware may install a backdoor so that the computer system can be accessed at a later time. The backdoor opens a port through which another computer system can gain access to the infected computer system. The technique can initiate a port scan from another computer system to detect the presence of an open port. If, however, the malware only opens a port at designated times, then the scanning may not detect the open port. Another technique may compare the files of the infected operating system with files of a non-infected or "clean" operating system. In particular, the technique may generate hash codes for the files of the infected operating system and compare them to hash codes of the clean operating system. However, since the malware may have control over the computer system, it can provide the clean version, rather than the infected version, of a file to a program that is calculating the hash codes.

Because of the difficulty in detecting malware, some computer users have resorted to reinstalling an operating system onto a storage device that might be infected from a storage device that contains a copy of the operating system that is known (or thought) to be clean. Such reinstalling of an operating system is time-consuming. Moreover, such reinstalling is unnecessary if the operating system was not actually infected—although the user could not be sure that it was not infected.

SUMMARY

A method and system for determining whether resources of a computer system are being hidden is provided. A security system identifies resources that are being hidden by malware executing in user mode. To identify hidden resources, the security system invokes a high-level function of user mode that is intercepted and filtered by the malware to identify resources (the "lie" list). The security system also directly invokes a low-level function of kernel mode that is not intercepted and filtered by the malware to identify resources (the "truth" list). After invoking the high-level function and the low-level function, the security system compares the lie list to the truth list. If the truth list contains a resource that is not in the lie list, then the security system may consider the resource to be hidden. By directly invoking low-level functions of kernel mode, the security system can detect that user mode malware is attempting to hide resources by intercepting user mode invocations of high-level functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
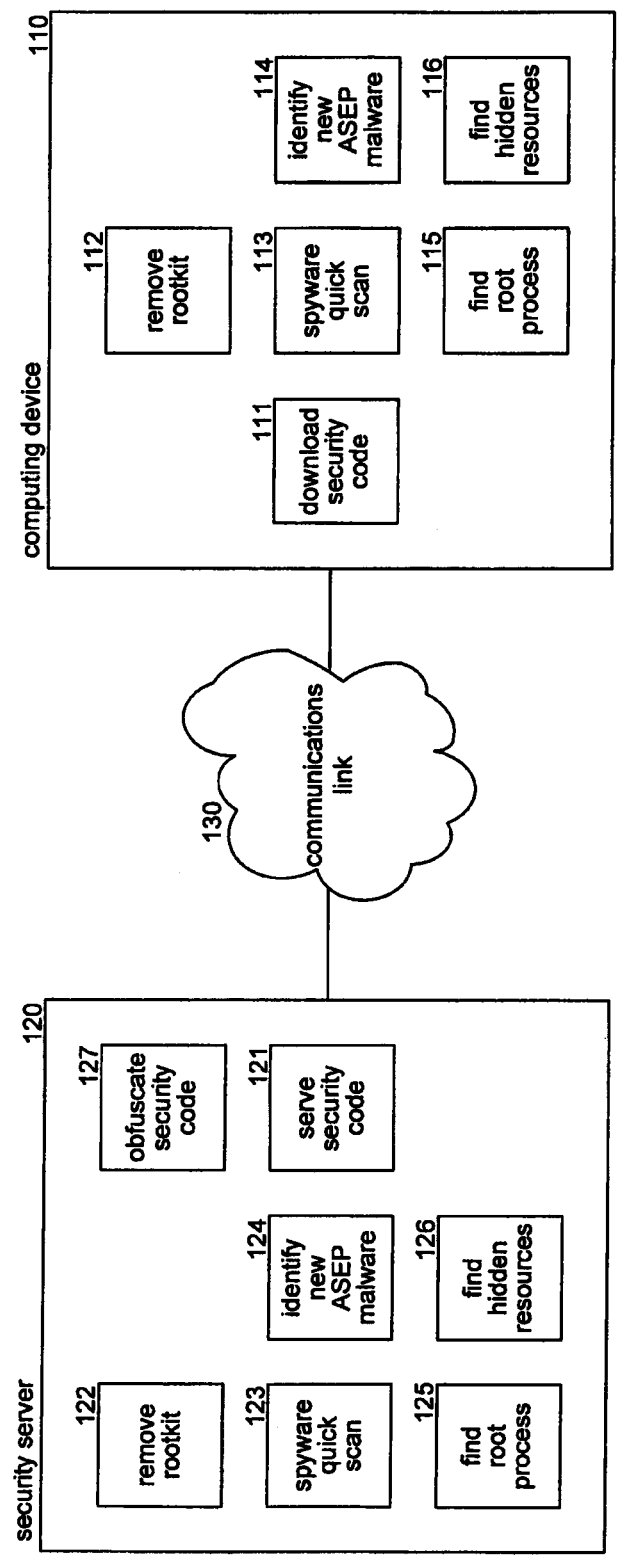
FIG. 1 is a block diagram that illustrates components of the security system in one embodiment.

A method and system for determining whether resources of a computer system are being hidden is provided. In one embodiment, a security system identifies resources that are being hidden by malware executing in user mode. To identify hidden resources, the security system invokes a high-level function of user mode that is intercepted and filtered by the malware to identify resources (the "lie" list). For example, the security system may invoke the Process32First and Process32Next APIs of WINDOWS to identify the processes. The malware executing in user mode will intercept and filter the results of these high-level functions. In particular, the malware will filter out all references to resources (e.g., processes, registry entries, files, and directories) that may indicate the presence of malware. The security system also invokes a low-level function of kernel mode that is not intercepted and filtered by the malware to identify resources (the "truth" list). For example, the security system may have code that stores parameters of the low-level function on the user mode stack, stores an indication of the low-level function in a register, and then causes the operating system to transition to kernel mode to execute the low-level function. The malware executing in user mode will not be able to intercept and filter the results of this low-level function unless it can somehow identify and replace the code before it is executed. After invoking the high-level function and the low-level function, the security system compares the lie list to the truth list If the truth list contains a resource that is not in the lie list, then the security system may consider the resource to be hidden. It is, however, possible that a resource may be created after the security system invokes the high-level function but before the security system invokes the low-level function or may be destroyed after the security system invokes the low-level function but before the security system invokes the high-level function. In either case, the security system may indicate that a resource is hidden when no attempt is being made to hide the resource. To prevent such detection of false positive "hidden" resources, the security system may invoke the high-level function and the low-level function multiple times. If the results consistently indicate that a resource is hidden, then the security system may assume that the resource is hidden with a high degree of confidence. By checking multiple results, transient resources will not be identified as being hidden. In this way, by directly invoking low-level functions that execute in kernel mode, the security system can detect user mode malware that is attempting to hide resources by intercepting user mode invocations of high-level functions.

In one embodiment, the security system identifies hidden processes, which are considered to be the malware, and then determines whether the hidden process is a root process. A root process is a process of a rootkit whose access to system resources is not filtered by the malware. A root process is not infected in the sense that its invocations of high-level functions will return true results. The security system may inject code into a hidden process to determine whether the process is having resources hidden from it. Malware will not filter results (i.e., hide resources) of the high-level functions invoked by its own root processes. Thus, if the injected code of the hidden process reports that no resources are being hidden, then the security system may assume that the hidden process is a root process. The injected code may be the code, as described above, that invokes a high-level function and a low-level function and compares their results. If the hidden process is a root process, then the lie list and the truth list will be the same and indicate that the malware is not filtering the high-level function invocations of the hidden process. In contrast, if the injected code of the hidden process reports that resources are being hidden, then the security system may assume that the hidden process is not a root process. In this way, the security system can confirm that a hidden process is likely a root process.

In one embodiment, once the security system identifies a process as a root process, the security system uses the name of the executable file of that process to trick the malware into not infecting non-malware processes. The security system renames certain non-malware executable files to have the same name as the malware executable file and then launches that renamed executable file as a process. The malware executing on the computer system may incorrectly recognize the processing of the renamed executable file as being a root process. In such a case, the malware will allow the process to execute without adversely affecting its behavior. The security system may rename an operating system shell file (e.g., cmd.exe) to have the same name as the root process executable file. After the renamed shell file is launched as a process, the security system may perform various security related functions by launching processes as child processes of the shell. In general, malware will allow its own root process and other related processes (e.g., child processes of the root process) to execute without adversely affecting their behavior. A process is considered to be related to itself and all its descendent processes. The security related functions may include additional functions such as malware detection and removal (e.g., virus scanning), restoring of anti-malware configuration settings, and restarting of anti-malware systems.

In one embodiment, the code of the security system may be downloaded from a security server onto a computing device whenever the security system is to check for hidden resources of the computing device. The code of the security system may be downloaded and executed when a user submits a request to the security server. If the code of the security system is persistently stored at the computing device, then the malware may be able to identify and infect the security system. Even if the code is not stored persistently, the malware may be able to identify the code of the security system as it is being downloaded from the security server and infect it at that point. To reduce the chances of such identification, the security server may use various obfuscation techniques to hide the identity of the code of the security system. For example, the security server may perform some binary translation of the code of the security system such as rearranging its basic blocks or encrypting the code. After the check for hidden resources is complete, the security system can remove itself from the computing device to help reduce the chances of a hacker gaining knowledge of the security code that can then be used to counteract the security code.

In one embodiment, the security system may be used to identify hidden registry entries. Certain registry entries, such as auto-start extensibility points ("ASEPs"), reference executable files that are automatically executed by the operating system. Malware may create such registry entries so that the malware may be automatically launched by the operating system. To prevent detection, malware will hide these registry entries. The security system may identify these hidden registry entries by comparing a lie list to a truth list and then remove the hidden registry entries. The security system may also generate a signature (e.g., hash value) of an executable file pointed to by a registry entry and report the signature to a security server. That signature can then be used to help detect the presence of malware on a computing device.

In one embodiment, the security system may use the hidden resource information to help guide the search for malware. Some anti-malware systems such as anti-spyware software may scan various file system directories trying to identify malware. Because it can take a considerable amount of time to scan all the file system directories, such anti-malware systems often have a quick scan mode in which only certain suspect directories are scanned. The suspect directories are those in which certain malware is known to store its files. Thus, the quick scan mode can be effective in identifying malware. When the security system identifies a hidden directory or a directory of an executable file of a hidden process, the security system can add these directories to the list of suspect directories that are to be checked in the quick scan mode of the anti-malware systems. By adding these directories to the list of suspect directories, the security system can improve the effectiveness of the quick scan mode with very little overhead.

User-mode malware intercepts system application programming interface ("API") calls at various levels in order to hide its resources. Such malware may intercept the calls by modifying the Import Address Table of a process or by inserting redirection instructions into system APIs at either a subsystem API level (e.g., kernel32, advapi32, etc.) or a native API level (e.g., ntdll), which are referred to as high-level functions. In order to detect the hiding, the security system completely bypasses these high-level functions by invoking low-level functions of the kernel mode directly. To invoke low-level functions of the kernel mode directly, the security code sets up the user mode stack with the parameters for the low-level function. To set up the user mode stack, the security code may define a private function with a signature that matches a native API that may be infected, such as NtQuerySystemInformation of WINDOWS. The private function may store the index of the low-level function in a register (e.g., EAX) and store the address of a transition function that transitions to kernel mode on another register (e.g., EDX). The private function then calls the transition function. Upon return from kernel mode, the private function returns. Table 1 is an example of a private function corresponding to the native API NtQuerySystemInformation that directly invokes a low-level function of kernel mode.

TABLE 1

```
_declspec(naked)
NTSTATUS
NTAPI
MyNtQuerySystemInformation(
    SYSTEM_INFORMATION_CLASS SystemInformationClass,
    PVOID SystemInformation,
    ULONG SystemInformationLength,
    PULONG ReturnLength)
{
    _asm
    {
        mov eax, 0xAD
          lea edx, [esp+0x04]
        Int2eh
        ret 10h
    }
}
```

The _declspec(naked) compiler directive prevents the compiler from generating prolog code for the private function in order to ensure that the user mode stack is in the right form at the time of a kernel mode transition. The private function is labeled as NTAPI to ensure that the right C calling convention is used (e.g., _stdcall). The private function moves a value into the EAX register that is the index into a kernel mode function dispatch table that tells the operating system which low-level function to invoke. This value is unique to the low-level function but may vary from version to version of the operating system. The parameters of the private function match the parameters of the corresponding native API. To help prevent the private function from being intercepted by malware, the security code may insert the code of the private function inline and may obfuscate the code by adding instructions that do not affect behavior of the private function.

FIG. 1 is a block diagram that illustrates components of the security system in one embodiment. The security system may be installed on a computing device 110 that is connected to a security server 120 via a communications link 130. The security system installed on the computing device may include a download security code component 111, a remove rootkit component 112, a spyware quick scan component 113, an identify new ASEP malware component 114, a find root process component 115, and a find hidden resources component 116. To identify a hidden process, the find root process component invokes the find hidden resources component to identify hidden processes by comparing a lie list generated by a high-level function to a truth list generated by a low-level function. To identify a root process, the remove rootkit component invokes the find root process component to identify a hidden process as a root process by injecting code to determine whether resources are being hidden from the hidden process. The remove rootkit component then identifies the executable file of the root process, renames an operating system shell file to have the same name as that executable file, launches the renamed shell file as a process, and performs security functions within the executing shell. The spyware quick scan component identifies directories that may contain spyware, adds those directories to a list of suspect directories, and then scans the suspect directories for spyware. The identify new ASEP malware component identifies hidden ASEP registry entries, generates signatures for the files referenced by the hidden registry entries, and reports the signatures. Anti-malware software may use the reported signatures to help identify malware.

The security server includes a serve security code component 121, a remove rootkit component 122, a spyware quick scan component 123, an identify new ASEP malware component 124, a find root process component 125, a find hidden resources component 126, and an obfuscate security code component 127. The components 122-126 correspond to components 112-116 of the computing device. The serve security code component downloads components 122-126 to the computing device via the communications link. The serve security code component may invoke the obfuscate security code component before downloading components 122-126 to translate the binaries to obfuscate the security nature of the components. The download security code component of the computing device may request that components 122-126 be downloaded when the check for hidden resources is to be performed. The download security code component may remove the downloaded components from the computing device when the check is complete.

Computing devices on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

The security system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The security system may be implemented on computing devices that include personal digital assistants ("PDAs"), cell phones, consumer electronic devices (e.g., audio playback devices), game devices, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
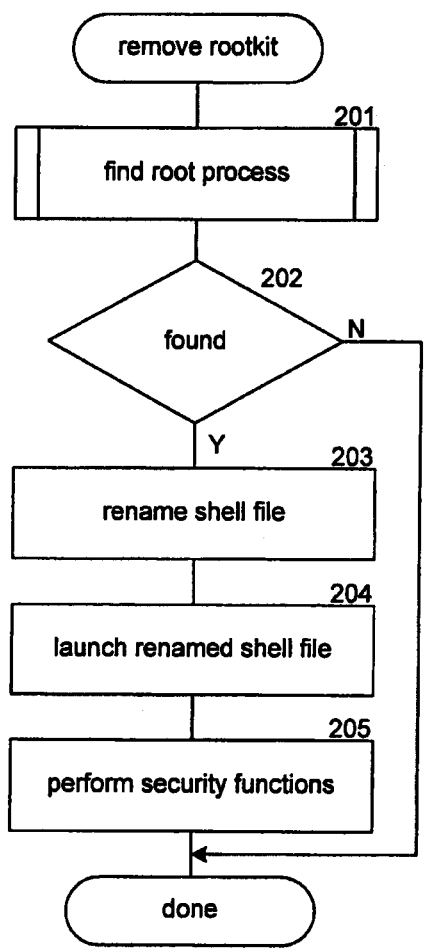
FIG. 2 is a flow diagram that illustrates the processing of the remove rootkit component of the security system in one embodiment.

FIG. 2 is a flow diagram that illustrates the processing of the remove rootkit component of the security system in one embodiment. The component finds a process that is a root process, renames a shell file to the name of the executable file of the root process, launches the renamed shell file as a process, and performs security functions within the process. In block 201, the component invokes the find root process component. In decision block 202, if a root process is found, then the component continues at block 203, else the component completes. In block 203, the component renames a shell file to the name of the executable file of the root process. In block 204, the component launches the renamed shell file. In block 205, the component performs various security functions (e.g., virus scanning) by launching security code under that process. The component then completes.

Figure 3:
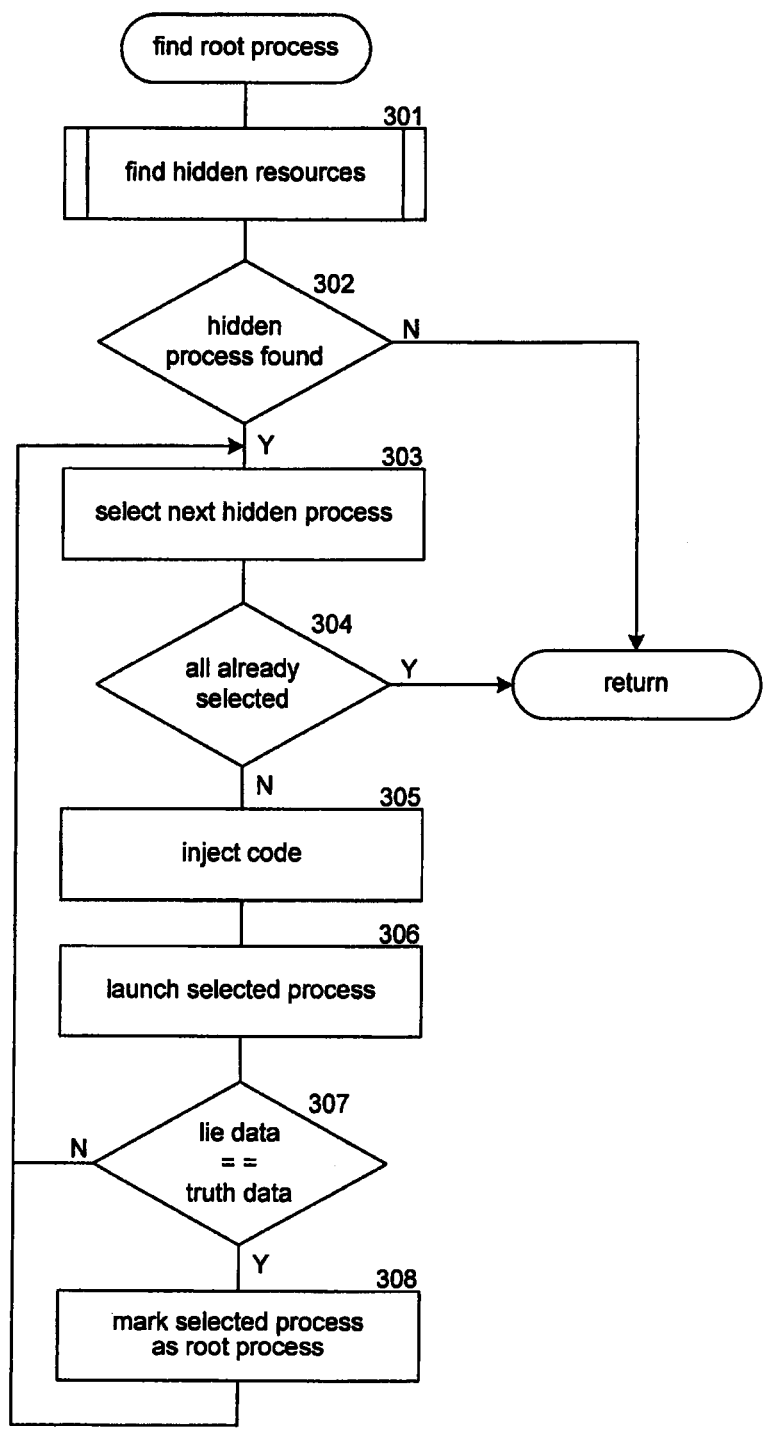
FIG. 3 is a flow diagram that illustrates the processing of the find rootkit process component of the security system in one embodiment.

FIG. 3 is a flow diagram that illustrates the processing of the find root process component of the security system in one embodiment. The component identifies hidden processes and then determines whether a hidden process is a root process by injecting code to determine whether resources are being hidden from that process. In block 301, the component invokes the find hidden resources component to identify hidden Processes. In decision block 302, if a hidden process is found, then the component continues at block 303, else the component returns. In blocks 303-308, the component loops selecting each hidden process and determining whether it is a root process. In block 303, the component selects the next hidden process. In decision block 304, if all the hidden processes have already been selected, then the component returns, else the component continues at block 305. In block 305, the component injects code to generate a lie list and a truth list into the selected process. In block 306, the component launches the selected process with the injected code. In decision block 307, if the lie list and the truth list indicate that no resources are being hidden from the launched process, then the selected process is a root process and the component continues at block 308, else the selected process is not a root process and the component loops to block 303 to select the next hidden process. In block 308, the component marks the selected process as a root process and then loops to block 303 to select the next hidden process.

Figure 4:
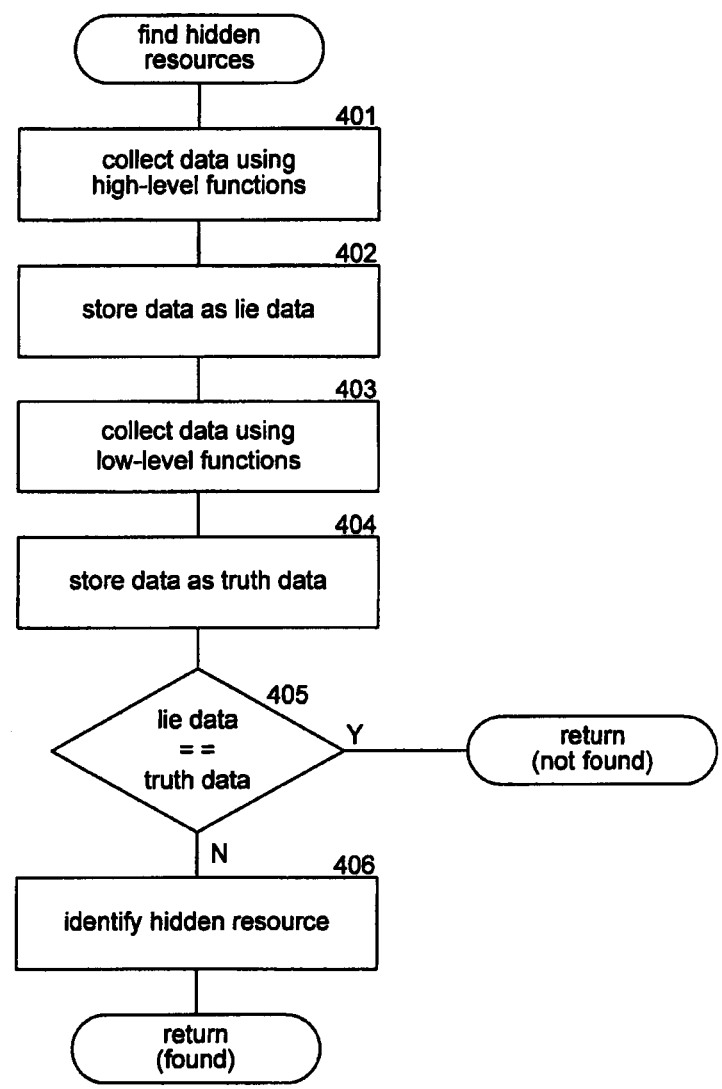
FIG. 4 is a flow diagram that illustrates the processing of the find hidden resources component of the security system in one embodiment.

FIG. 4 is a flow diagram that illustrates the processing of the find hidden resources component of the security system in one embodiment. The component compares the lie list generated by high-level functions to the truth list generated by low-level functions to determine whether resources are being hidden. The component may be tailored to identify only one type of hidden resource (e.g., processes) or may identify different types of hidden resources (e.g., processes, files, and registry entries). In block 401, the component collects data by invoking high-level functions of user mode. In block 402, the component stores the collected data as the lie list. In block 403, the component collects data by directly invoking the low-level functions of kernel mode. In block 404, the component stores the collected data as the truth list. In decision block 405, if the lie list is the same as the truth list, then no resource is being hidden and the component returns an indication that no hidden resource has been found, else the component continues at block 406. In block 406, the component identifies the hidden resources and returns an indication that a hidden resource was found.

Figure 5:
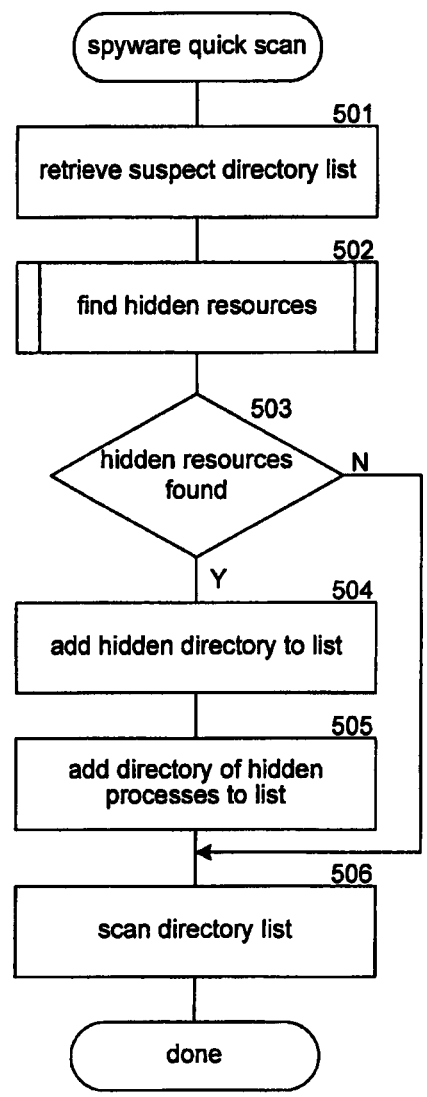
FIG. 5 is a flow diagram that illustrates the processing of the spyware quick scan component of the security system in one embodiment.

FIG. 5 is a flow diagram that illustrates the processing of the spyware quick scan component of the security system in one embodiment. The component adds to a list of suspect directories the directories of executable files of hidden processes and hidden directories and then scans the suspect directories for malware. In block 501, the component retrieves the list of suspect directories that are to be checked during the quick scan process. In block 502, the component invokes the find hidden resources component to identify whether resources are being hidden. In decision block 503, if a hidden resource has been found, then the component continues at block 504, else the component continues at block 506. In block 504, the component adds any hidden directories to the list of suspect directories. In block 505, the component adds the directory of the executable file of any hidden processes to the list of suspect directories. In block 506, the component scans the suspect directories for malware and then completes.

Figure 6:
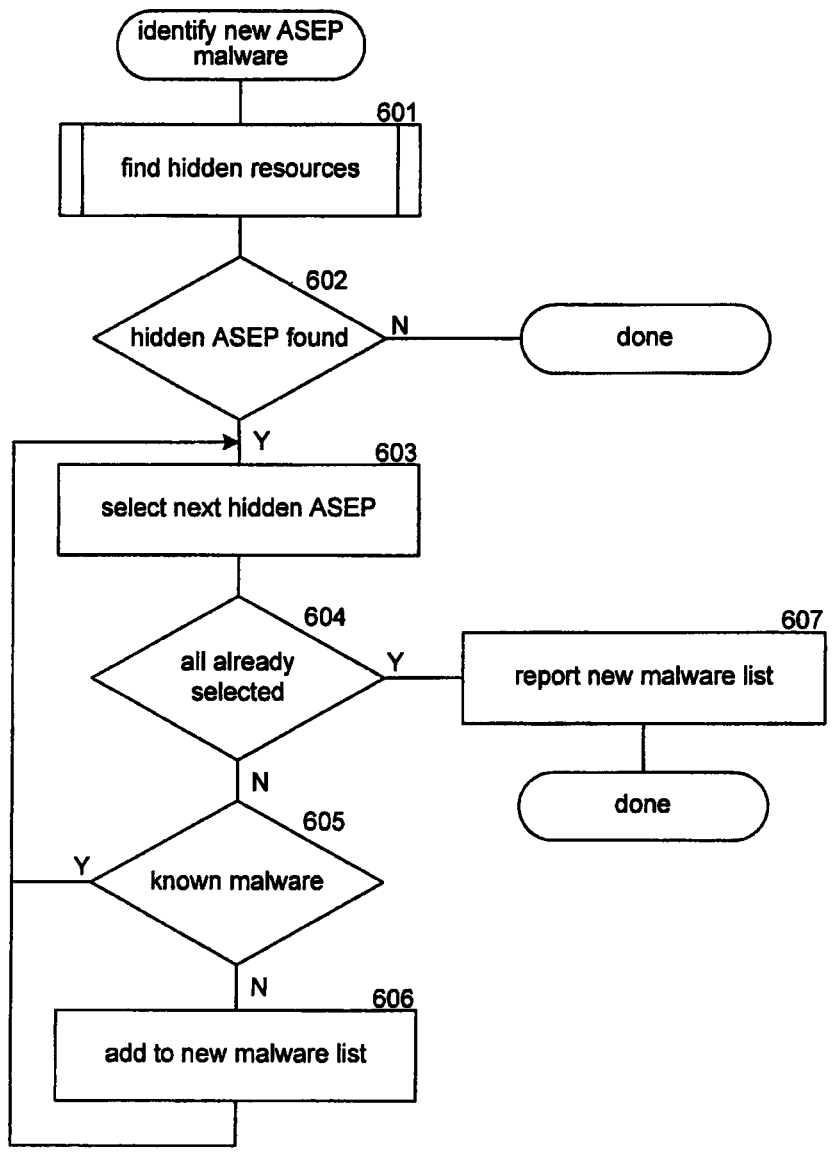
FIG. 6 is a flow diagram that illustrates the processing of the identify new ASEP malware component of the security system in one embodiment.

FIG. 6 is a flow diagram that illustrates the processing of the identify new ASEP malware component of the security system in one embodiment. The component identifies hidden ASEP registry entries of the system registry and reports the signature of the referenced file for use in detecting malware. In block 601, the component invokes the find hidden resources component to find the hidden ASEP registry entries. In decision block 602, if any hidden ASEP registry entries have been found, then the component continues at block 603, else the component completes. In blocks 603-606, the component loops determining whether the referenced files of the hidden ASEP entries have been identified as malware by comparing their signature to the signatures of known malware. In block 603, the component selects the next hidden ASEP registry entry. In decision block 604, if all the hidden ASEP registry entries have already been selected, then the component continues at block 607, else the component continues at block 605. In decision block 605, the component compares the signature of the referenced file to the signature of known malware. If a match is found, then the malware was previously known and the component loops to block 603 to select the next hidden ASEP registry entry, else the component continues at block 606. In block 606, the component adds the signature of the referenced file to the list of new malware and then loops to block 603 to select the next hidden ASEP registry entry. In block 607, the component reports (e.g., to a security server) the new list of malware and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the terms user mode and kernel mode refer generally to different privilege levels for executing processes. Application programs generally execute in user or application mode with a relatively low privilege level, and some programs of an operating system execute in a kernel or operating system mode with a high privilege level. As used herein, kernel mode refers to any privilege level higher than user or application mode. Malware often executes in user mode because user mode APIs of an operating system are easier to intercept than kernel mode APIs and because user mode APIs generally do not change from version to version of an operating system while kernel mode APIs often change. Accordingly, the invention is not limited except as by the appended claims.

We claim:

1. A method in a computer system with a processor and a memory for determining whether a process being hidden is a root process of malware, a root process being a process of the malware whose access to system resources is not filtered by the malware, the method comprising:
   determining whether a process that is executing code is hidden;
   after determining that the process is hidden, injecting code into malware code executed by the hidden process, the injected code for determining whether a resource is hidden from a process that is executing the malware code;
   after injecting the code,
      launching execution of the malware code as a process; and
      during execution of the injected code within the launched process, determining whether a resource is hidden from the launched process by generating a lie list and a truth list of resources and determining that no resource is hidden when the generated lie list and truth list are the same; and
   upon determining that no resource is hidden from the launched process, marking the hidden process as a root process.

2. The method of claim 1 wherein the resources are processes.

3. The method of claim 1 wherein the resources are registry entries.

4. The method of claim 1 wherein the lie list is generated by invoking a high-level function of an operating system and the truth list is generated by invoking a low-level function of the operating system.

5. The method of claim 1 including upon determining that a resource is hidden from the launched process, indicating that the hidden process is not a root process.

6. The method of claim 1 wherein the determining of whether a process is hidden includes generating a lie list of processes by invoking a high-level operating system function, generating a truth list of processes by invoking a low-level operating system function, and identifying process as being hidden when the process is in the truth list but not in the lie list.

7. The method of claim 1 wherein a hidden process has an associated executable file with a name and after indicating that the hidden process is a root process, renaming another executable file to have the same name as the executable file associated with the hidden process so that malware will not hide resources from a process associated with the renamed executable code.

8. A computer-readable storage device containing computer-executable instructions for controlling a computing device to identify a root process of malware without rebooting the computing device by a method comprising:
   determining whether a process is hidden;
   after determining that a process is hidden,
      injecting code into code of the hidden process, the injected code for collecting information to determine whether a resource is hidden when the code executes as a process;
      launching execution of the code of the hidden process with the injected code; and
      during execution of the injected code, collecting information to determine whether a resource is hidden from the injected code by generating a lie list and a truth list of resources and determining that no resource is hidden when the generated lie list and truth list are the same; and
   after determining based on the collected information that no resource is hidden from the injected code, indicating that the hidden process is a root process so that a root process can be identified without having to reboot the computing device.

9. The computer-readable storage device of claim 8 wherein the lie list is generated by invoking a high-level function of an operating system and the truth list is generated by invoking a low-level function of the operating system.

10. The computer-readable storage device of claim 8 including after determining that a resource is hidden from the injected code, indicating that the hidden process is not a root process.

11. The computer-readable storage device of claim 8 where the determining of whether a process is hidden includes generating a lie list of processes by invoking a high-level operating system function, generating a truth list of processes by invoking a low-level operating system function, and identifying process as being hidden when the process is in the truth list but not in the lie list.

12. The computer-readable storage device of claim 8 wherein a hidden process has an associated executable file with a name and after indicating that the hidden process is a root process, renaming another executable file to have the same name as the executable file associated with the hidden process so that malware will not hide resources from a process associated with the renamed executable code.

13. A computing device for identifying a root process of malware comprising:
   a memory storing an identification of a process that is hidden and storing computer-executable instructions of
      a component that after the process is identified as a hidden process, injects code into code of the process;
      a component that launches a hidden process to execute the code along with the injected code; and
      a component that, during execution of the injected code of the hidden process, collects information to determine whether a resource is hidden from the hidden process, the collected information including a lie list and a truth list of resources wherein no resource is hidden when the lie list and truth list are the same; and
      a component that, after determining based on the collected information that no resource is hidden from the hidden process, marks that the hidden process is a root process; and a processor for executing the computer-executable instructions stored in the memory.

14. The computing device of claim 13 wherein the lie list is generated by invoking a high-level function of an operating system and the truth list is generated by invoking a low-level function of the operating system.

15. The computing device of claim 13 including a component that, after determining that a resource is hidden from the hidden process, indicates that the hidden process is not a root process.

16. The computing device of claim 13 wherein including a component that determines whether a process is hidden by generating a lie list of processes by invoking a high-level operating system function, generates a truth list of processes by invoking a low-level operating system function, and identifies a process as being hidden when the process is in the truth list but not in the lie list.

17. The computing device of claim 13 wherein a hidden process has an associated executable file with a name and a component that, after indicating that the hidden process is a root process, renames another executable file to have the same name as the executable file associated with the hidden process so that malware will not hide resources from a process associated with the renamed executable code.

* * * * *